United States Patent
Callari et al.

(10) Patent No.: US 8,660,383 B1
(45) Date of Patent: Feb. 25, 2014

(54) SYSTEM AND METHOD OF ALIGNING IMAGES

(75) Inventors: Francesco Callari, San Francisco, CA (US); Michael Weiss-Malik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/547,428

(22) Filed: Jul. 12, 2012

Related U.S. Application Data

(62) Division of application No. 12/075,817, filed on Mar. 14, 2008, now Pat. No. 8,260,006.

(51) Int. Cl.
*G06T 7/00* (2006.01)
*G06T 11/60* (2006.01)
*G06T 17/05* (2011.01)

(52) U.S. Cl.
USPC ............ 382/294; 382/113; 382/195; 382/276

(58) Field of Classification Search
CPC ..... G06T 11/60; G06T 7/0024; G06T 7/0081; G06T 17/05
USPC .................................. 382/113, 195, 276, 294
See application file for complete search history.

(56) References Cited

U.S. PATENT DOCUMENTS

| | | | |
|---|---|---|---|
| 6,064,399 A | 5/2000 | Teo | |
| 6,084,989 A * | 7/2000 | Eppler | 382/293 |
| 6,128,108 A | 10/2000 | Teo | |
| 6,349,153 B1 | 2/2002 | Teo | |
| 6,385,349 B1 | 5/2002 | Teo | |
| 6,496,189 B1 | 12/2002 | Yaron et al. | |
| 6,587,601 B1 | 7/2003 | Hsu et al. | |
| 6,597,818 B2 * | 7/2003 | Kumar et al. | 382/294 |
| 6,694,064 B1 | 2/2004 | Benkelman | |
| 6,785,427 B1 | 8/2004 | Zhou | |
| 6,970,593 B2 | 11/2005 | Furukawa | |
| 7,239,759 B2 * | 7/2007 | Nam et al. | 382/305 |
| 7,356,201 B2 * | 4/2008 | Gunther et al. | 382/294 |
| 7,660,441 B2 * | 2/2010 | Chen et al. | 382/113 |
| 8,160,397 B1 * | 4/2012 | Wu | 382/294 |
| 8,340,360 B2 * | 12/2012 | Chen et al. | 382/113 |
| 2004/0215659 A1 | 10/2004 | Singfield et al. | |
| 2006/0041375 A1 * | 2/2006 | Witmer et al. | 701/208 |

OTHER PUBLICATIONS

C. Heipke, R. Schmidt, R. Brand, J. Oberst, G. Neukum, and the HRSC Co-Investigator Team; Performance of Automatic Tie Point Extration Using HRSC Imagery of the Mars Express Mission, Commission IV, WG IV/9, 6 pages, 2004.

Jeffrey Dean and Sanjay Ghemawat, MapReduce: Simplified Data Processing on Large Cluster, 2004.

http://www.tidbits.com/tb-issues/tidbits-250.html#Ink6, 1994.

Shenchang Eric Chen, QuickTime VR-An Image Based Approach to Virtual Environment Navigation, pp. 29-38, 1995.

Crotty, Cameron, QuickTime VR: a new spin, Oct. 1994, 3 pages.

(Continued)

*Primary Examiner* — Matthew Bella
*Assistant Examiner* — Jose M Torres
(74) *Attorney, Agent, or Firm* — Lerner, David, Littenberg, Krumholz & Mentlik, LLP

(57) ABSTRACT

A system and method is provided for aligning images of one resolution based on both features contained in the images and the alignment of related images of a different resolution.

7 Claims, 15 Drawing Sheets

(56) References Cited

OTHER PUBLICATIONS

An Historical QTVR Document; http://lists.apple.com/archives/QuickTime-VR/2004/Aug/msg00313 . . . , 2007.
History of Quicktime VR; http://lists.apple.com/archives/QuickTime-VR/2005/Nov/msg00037 . . . , 2007.
History of Quicktime VR; http://lists.apple.com/archives/QuickTime-VR/2005/Nov/msg00112 . . . , 2007.
History of Quicktime VR; http://lists.apple.com/archives/QuickTime-VR/2005/Nov/msg00299 . . . , 2007.
Panoramic Video, Using Apple's QuickTime VR and Microsoft's Surround Video, Enables Photo-Quality Virtual Reality on Your Computer Screen; www.byte.com, 2005.
Barclay et al., "Terraservice.NET: An Introduction to Web Services," Technical Report MS-TR-2002-53, Microsoft Research, Jun. 2002.

* cited by examiner

FIGURE 4
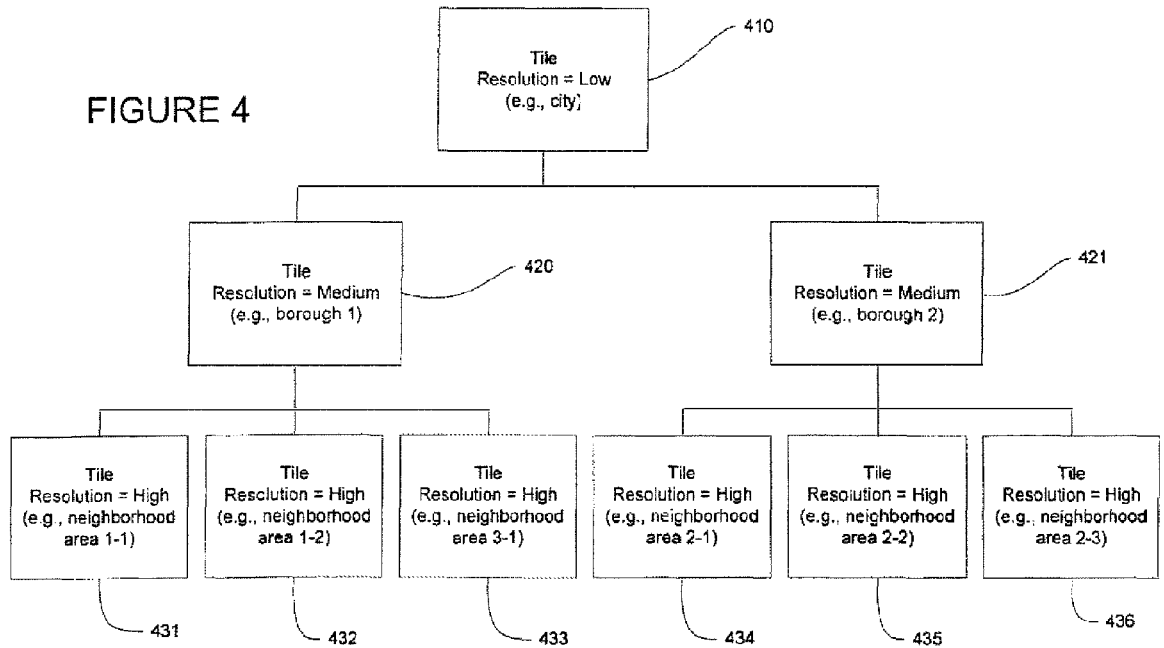
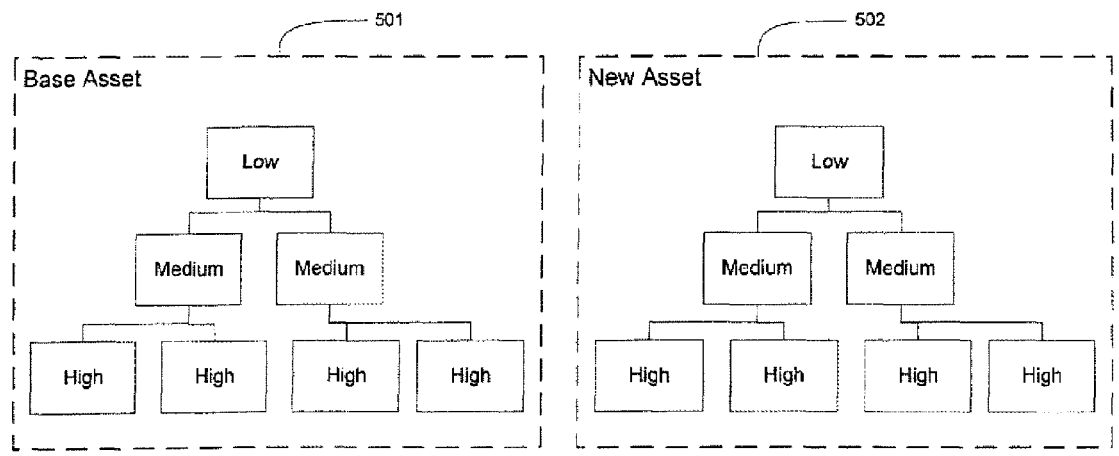
FIGURE 5

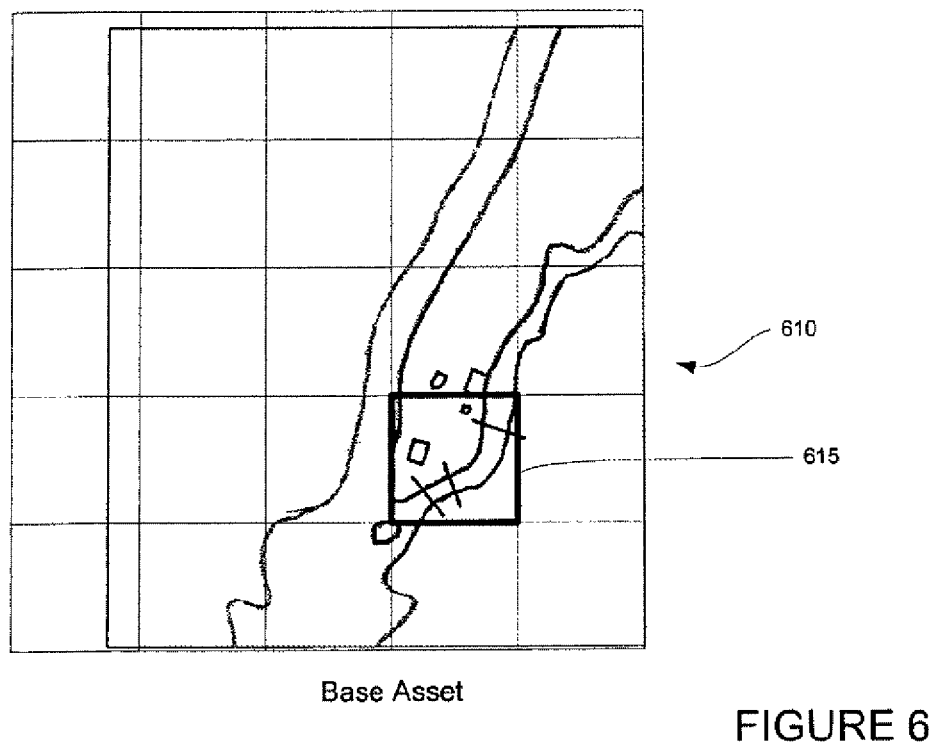
Base Asset
FIGURE 6
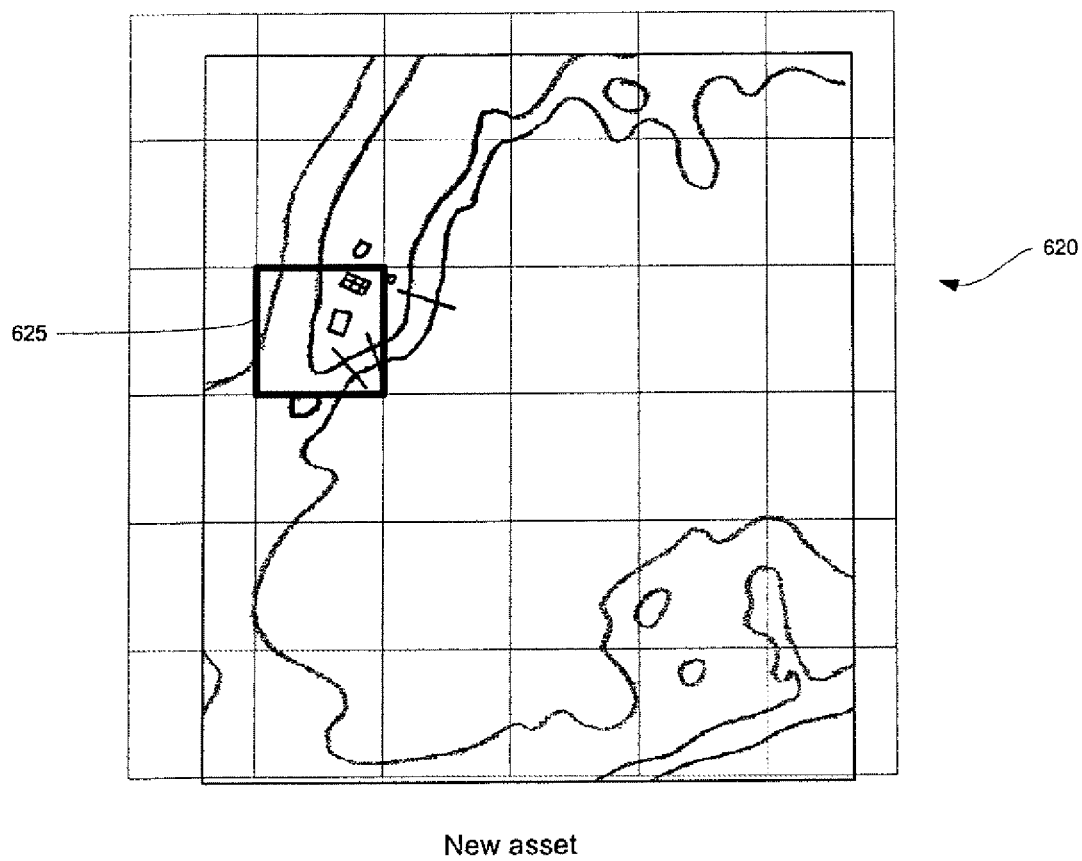
New asset

SYSTEM AND METHOD OF ALIGNING IMAGES

CROSS-REFERENCE TO RELATED APPLICATIONS

The present application is a divisional of U.S. patent application Ser. No. 12/075,817, filed on Mar. 14, 2008 now U.S. Pat. No. 8,260,006, the disclosure of which is incorporated herein by reference.

BACKGROUND OF THE INVENTION

Satellite images, aerial images, and other geographic images, are available from a number of different sources, such as providers of satellite imagery for the purpose of earth visualization, map production and related purposes.

Geographic assets typically include both an image such as that mentioned above, and an identification of where the image may be found. For example, an asset may be associated with both a digitized image and geo-location data, that is, the relative position of the image pixels with respect to a geographical reference point. Geo-location data is typically expressed in terms of longitude and latitude.

It is helpful in many circumstances to simultaneously use information from two different assets. For example, a user may wish to view two different countries at a time, where each country is captured in a different asset. There may also be value in superimposing an image from one asset on top of another asset for the purpose of rendering a composite image or other processing.

Unfortunately, asset geo-location data is often subject to some amount of error. For example, even if two assets had identical geo-location data, the images associated with the assets may depict somewhat different geographic locations. Processing two assets based solely on their geo-location data may thus result in errors. This difference in geo-location data may be due to any number of factors, such as uncorrected errors in the recorded position and/or pose of the imaging equipment, or inaccuracies in the data or processes used to correct for photogrammetric distortions caused by terrain and man-made structures.

Previous attempts to overcome the problem have included manually "stitching" assets together. For example, a human operator may view pairs of misaligned images of the same general geographic area, and use software tools to identify specific points in one image that correspond to specific points in the other image. Distinctive visual features such as mountain peaks and road intersections are often used for this purpose. The process can be semi-automated in that the software can automatically extract candidate tie-points and offer them to the operator for view. Such software includes ERDAS Imagine from Leica Geosystems. The operator can also specify the type of deformation that ought to be applied in order to align the images. The software then automatically produces a possible alignment for the images using standard programmatic techniques such as bundle adjustment. The result is then reviewed by a human for quality control and, if it is not acceptable, the operator may provide additional tie points or specify the use of a different deformation.

This process is laborious, slow, requires skilled operators, is error prone, and impractical for use in connection with large numbers of assets.

There is a need for a system and method that mitigates the foregoing problems.

SUMMARY OF THE INVENTION

A system and method is provided that is intended to address the foregoing needs.

One aspect of the invention relates to a method of processing a first, second, third and fourth image, where the images including features and at least a portion of the first image includes a portion of the third image but at a different resolution. Moreover, at least a portion of the second image includes a portion of the fourth image but at a different resolution. The method includes: identifying a feature in the first image that matches a feature in the second image; determining first alignment data based on the position of the matching features within the first and second images; identifying a feature in the third image that matches a feature in the fourth image; and determining second alignment data based on the position of the matching features within the first and second images and the first alignment data. The features may be geographic features.

Another aspect of the invention relates to a system, where the system includes data having a first and second pyramid of geographic images. Each pyramid of geographic images includes a first layer having a geographic image of a first geographic area, a second layer having second and third images of second and third geographic areas. A portion of the second and third geographic areas overlap with the first geographic area, and a portion of the second and third images has greater detail than the first image. The system further includes instructions and a processor to execute the instructions. The instructions include: extracting features from the images in the first layer of the first and second pyramid; identifying features from the first layer of the first pyramid that correspond with features in the first layer of the second pyramid; computing a first alignment vector for the first layer of the second pyramid dependent on the difference in positions of the corresponding features in the first layer; extracting features from the images in the second layer of the first and second pyramid; identifying features in the second image of the first pyramid that correspond with features in the second image of the second pyramid; computing a second alignment vector for the second image of the second pyramid dependent on the difference in positions of the corresponding features in the second images, as well as the first alignment vector; identifying features in the third image of the first pyramid that correspond with features in the third image of the second pyramid; and computing a third alignment vector for the third image of the second pyramid dependent on the difference in positions of the corresponding features in the third images, as well as the first alignment vector.

Yet another aspect of the invention relates to a method of processing geographic images. The method includes: receiving a first and second geographic asset, wherein each asset comprises an image and geo-location data associated with the image; associating the first asset and second asset with a plurality of tiles, wherein each tile represents a portion of the image of the asset; identifying, in the image portion associated with a tile, aspects of the image that have distinct characteristics compared to the remainder of the image; comparing the identified characteristics in a first tile in the first asset with the identified characteristics in a second tile in the second asset and, for at least one of the identified characteristics, calculating first alignment data based on the position of the characteristics in the first tile and the second tile; receiving a third geographic asset, wherein the image of the third asset corresponds with a portion of the image in the second asset; and associating the third geographic asset with a plurality of tiles, wherein the location of each tile with respect to the image is based on the first alignment data.

A further aspect of the invention relates to a method of calculating alignment vectors associated with geographic images comprising: receiving a first and second image of geography, wherein the first image and second image overlap; dividing the first and second images into rectangles, wherein each rectangle is associated with an image comprising a portion of the first or second image, and wherein each rectangle is associated with a particular latitude and longitude; selecting a first rectangle from the first image; selecting a second rectangle from the second image based on the latitude and longitude of the first rectangle; identifying geographic features resident in the first and second rectangle images; identifying geographic features that are present in both the first and second rectangle images; calculating, with a computer, a first alignment vector whereby the features of the first and second rectangle will be aligned if the first and second rectangles images are rendered based on their latitude and longitude and the second rectangle is offset by the alignment vector, and; calculating a second alignment vector for a third image of geography and fourth image of geography based on the first alignment vector.

Yet a further aspect relates to a method of processing geographic images having features. The method includes associating a first data structure with first geo-location data and a first set of the features and a second data structure with second geo-location data and a second set of the features, wherein each feature is associated with a location. A value is applied to the first and second geo-location data, and a feature in the first set of features is associated with the second data structure dependent on the value and the location of the feature.

BRIEF DESCRIPTION OF THE FIGURES

FIG. 4 is a functional diagram of multiple resolution assets in accordance with an aspect of the invention.

FIG. 5 is a functional diagram of multiple resolution base and tile assets in accordance with an aspect of the invention.

FIG. 6 is a functional diagram of tiled base and new assets in accordance with an aspect of the invention.

DETAILED DESCRIPTION

Figure 1:
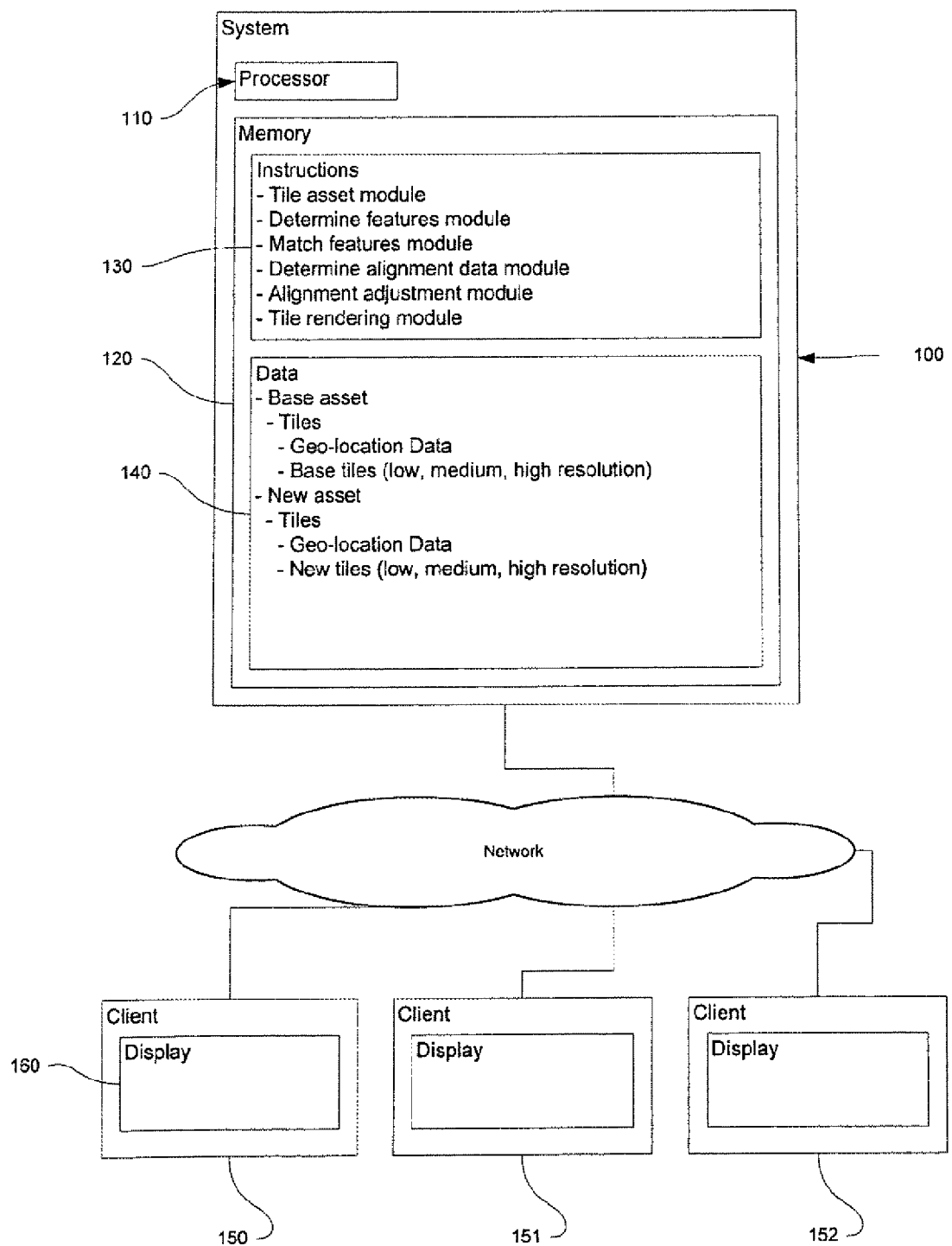
FIG. 1 is a diagram of a system in accordance with an aspect of the invention.

As shown in FIG. 1, a system in accordance with one aspect of the invention comprises a central system 100 and client 150.

In accordance with one aspect, system 100 comprises a computer having a processor 110, memory 120 and other components typically present in general purpose computers and, in particular, servers.

Memory 120 stores information accessible by processor 110 including instructions 130 for execution by the processor 110 and data 140 which is retrieved, manipulated or stored by the processor. The memory may be of any type capable of storing information accessible by the processor, such as a hard-drive, ROM, RAM, CD-ROM, write-capable, read-only, or the like.

Data 140 may be retrieved, stored or modified by processor 110 in accordance with the instructions 130. The data may be stored as a collection of data. For instance, although the invention is not limited by any particular data structure, the data may be stored in computer registers, in a relational database as a table having a plurality of different fields and records, XML documents or flat files. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor 110 and memory 120 are functionally illustrated in FIG. 1 within the same block, it will be understood by those of ordinary skill in the art that the processor and memory may actually comprise multiple processors and memories that may or may not be stored within the same physical housing. For example, some or all of the instructions and data may be stored on removable CD-ROM and others within a read-only computer chip. Some or all of the instructions and data may be stored in a location physically remote from, yet still accessible by, the processor. Similarly, and as explained further below, the processor may actually comprise a collection of processors which may or may not operate in parallel.

In one aspect, system 100 communicates with one or more client computers 150-152. Each client computer may be configured similarly to the system 100, with a processor, memory and instructions. Preferably, each client computer is a general purpose computer, intended for use by end users, having all the internal components normally found in a personal computer such as a central processing unit (CPU), display 160, CD-ROM, hard-drive, mouse, keyboard, speakers, microphone, modem and/or router (telephone, cable or otherwise) and all of the components used for connecting these elements to one another.

Computers in accordance with the systems and methods described herein may comprise any device capable of processing instructions and transmitting data to and from humans and other computers, including network computers lacking local storage capability, PDA's with modems and Internet-capable wireless phones.

The system 100 and client computers 150-152 comprise a network of computers. Although only a few computers are depicted in FIG. 1, it should be appreciated that a typical system can include a large number of connected computers. The network, and intervening nodes, may comprise various configurations and protocols including the Internet, intranets, virtual private networks, wide area networks, local networks, Ethernet, WiFi and HTTP. Such communication may be facilitated by any device capable of transmitting data to and from other computers, such as modems (e.g., dial-up or cable), network cards and wireless interfaces. System 100 may be a web server. Although certain advantages are obtained when information is transmitted or received as noted above, other aspects of the invention are not limited to any particular manner of transmission of information. For example, in some aspects, the information may be sent via a medium such as a disk, tape, or CD-ROM.

Data 140 includes a number of different data structures. For example, and as explained below, the data may include a base asset, new asset, and tiles of multiple resolutions associated with such assets.

The instructions 130 may comprise any set of instructions to be executed directly (such as machine code) or indirectly (such as scripts) by the processor. In that regard, the terms "instructions," "steps" and "programs" may be used interchangeably herein. Instructions 130 may include a number of different software modules.

For example, and as explained below, instructions 130 may include software modules for tiling assets, determining features in tiles, matching features in tiles, determining alignment data, adjusting the alignment, and rendering tiles. The functions, methods and routines of the program in accordance with the present invention are explained in more detail below.

Figure 2:
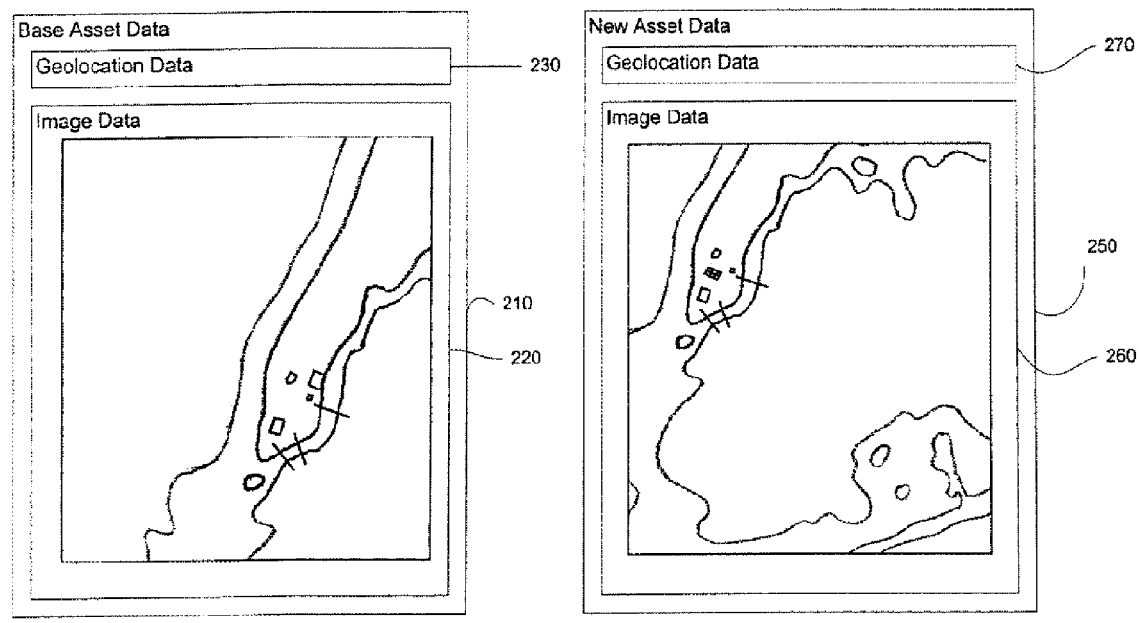
FIG. 2 is a functional diagram of asset data structures, and example images, in accordance with an aspect of the invention.
Figure 2:
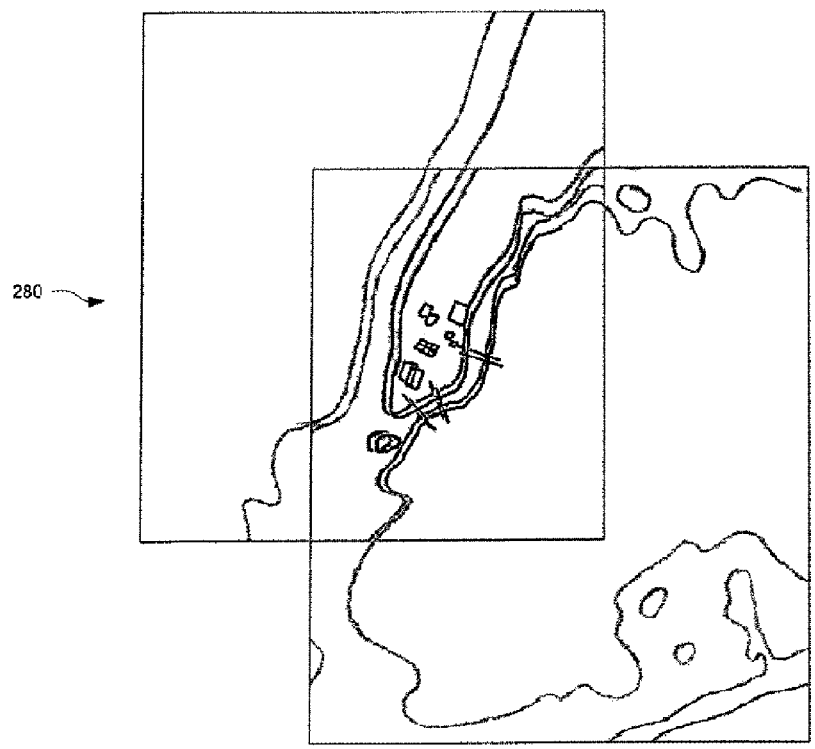

FIG. 2 shows an example of base asset and new asset data to be processed in accordance with an aspect of the present invention. The base asset 210 is associated with a digital image 220 of a geographical area, as well as geo-location data 230. It is assumed that the geo-location information 230 associated with the base asset is sufficiently accurate to be used as a reference with respect to other assets and processing. Although the invention is not limited to any particular format for storing an image, each of the images may be comprised of individual image pixels. It will be noted that the sample images and data set forth herein have been modified for ease of explanation.

New asset 250 is associated with a digital image 260 of a geographical area, at least some of which overlaps the base geographical area. In some instances, the new asset will be received after the base asset; however, although one aspect of the system and method advantageously processes newly-received assets with respect to prior-received assets, the reference to "new assets" is for illustration purposes only and not intended to connote how "new" the new asset is with respect to the base asset. The geo-location data 270 is such that if the two assets are processed together based solely on their geo-location data, their images will not be acceptably aligned. By way of example, illustration 280 of FIG. 2 shows how the two images of the two assets would appear if they were superimposed upon one another using only their geo-location data to determine their locations with respect to one another.

Figure 3:
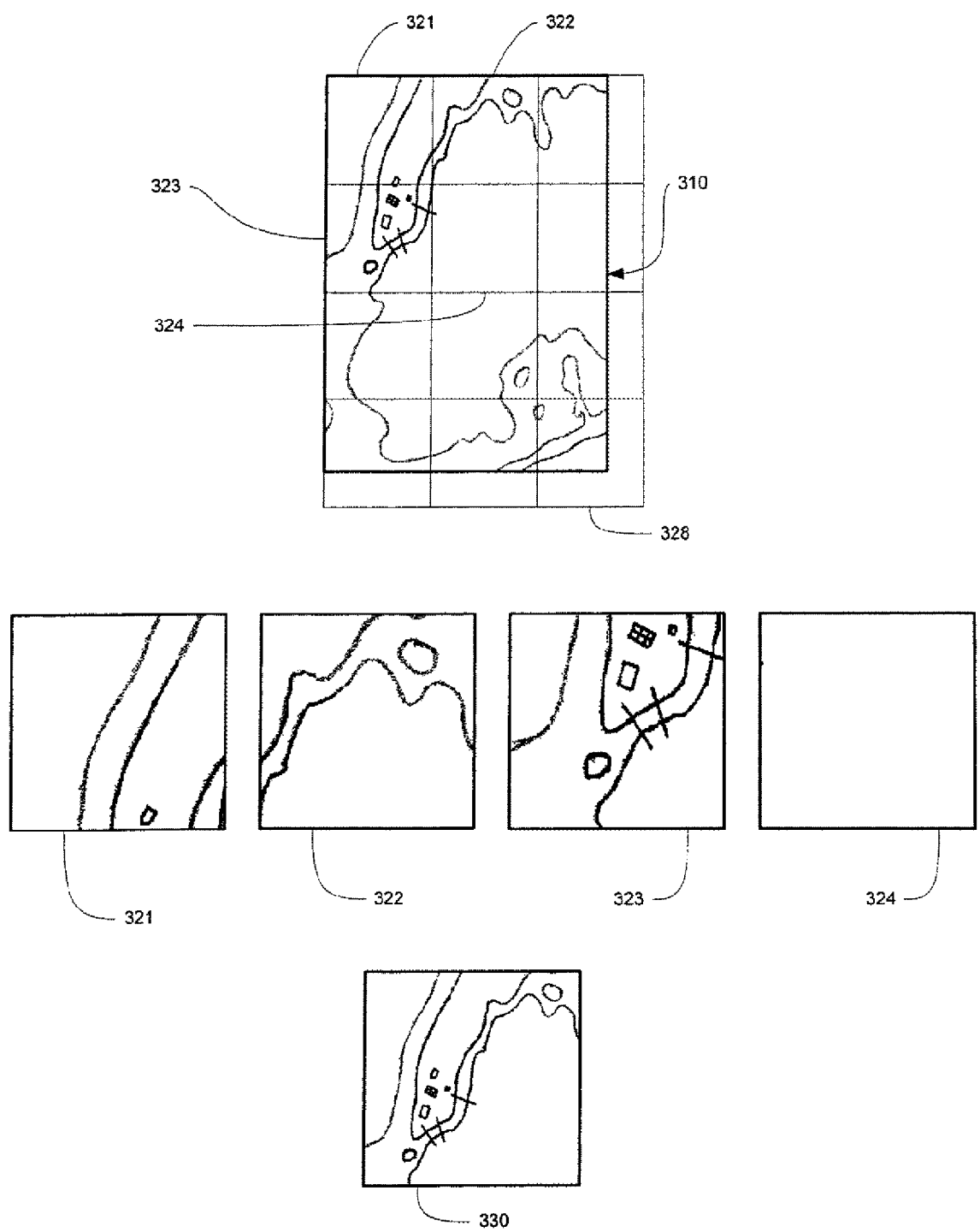
FIG. 3 is a functional diagram of tiles associated with an example image, in accordance with an aspect of the invention.

Assets are preferably divided into tiles of various, but related, resolutions. For example asset 310 of FIG. 3 represents a high-resolution image of a geographic area, such as a city. The high-resolution asset is then divided into individual tiles such as tiles 321-324, such that each tile is associated with both a portion of the image and a position within the asset. In one aspect of the invention, the tiles have the same pixel height and width, such as 256×256 pixels, though some tiles at the edge of the asset, such as tile 328, may not be completely filled.

The tiles from the high-resolution image may then be combined and down-sampled so as to form a new tile at a lower resolution, that is, the ratio between the number of pixels and geographic area covered. For example, tiles 321-324 may be combined and down-sampled so as form a new tile 330. Although new tile 330 may have the same pixel height and width as tiles 321-325, it covers a greater geographical area.

As shown in FIG. 4, this process may be continued until a single asset is associated with a number of different tiles of various resolutions. For example, the asset may be originally divided into a number of different high-resolution tiles 431-436 where each tile covers roughly a neighborhood of a city. A portion of these high-resolution tiles are then associated with a medium-resolution tile, such as tile 420. Thus, the high-resolution tiles collectively cover the same general geographic area as medium-resolution 420, but in more detail. A set of the medium resolution tiles, in turn, may be associated with a single low-resolution tile, such as tile 410. Thus, medium-resolution tiles 420 and 421 may cover a smaller geographical area (e.g., a city borough) than tile 410 (e.g., the entire city), but tiles 420 and 421 cover the area in a higher level of detail (e.g., 2 pixels per mile if tile 410 were at 1 pixel per mile).

If structured in this fashion, the collection of tiles may be modeled as a pyramid, with a lowest resolution tile covering the greatest amount of geographical area sitting at the top, and tiles in each subsequent layer covering a smaller geographical area but at a relatively higher resolution. Although each individual tile in a layer may cover less geographical area than the tile above it, the individual tiles may collectively cover roughly the same geographical area as the tile above it.

Moreover, although not all aspects are limited to a particular number of layers, tiles, shapes, positions or resolutions, in one aspect of a system and method: there are approximately 16 layers of tiles; each lower-resolution tile is associated with four higher-resolution tiles; the higher-resolution tiles are collectively associated with the same geographic area as the respective lower-resolution tile; the higher-resolution images have four times the number of pixels as their associated lower-resolution images; all of the tiles, regardless of resolution, have the same pixel height and width; the size of the tile is quite small compared to the size of the asset such that the vast majority of tiles are fully interior to the image; the entire image, or at least a portion thereof, is tiled; neighboring tiles do not overlap; and the tiles are rectangular (including square).

As shown in FIG. 5, both the base asset 501 and the new asset 502 may have this pyramid-like structure of tiles at various resolutions. Preferably, at any given layer, the base and new asset images have an equivalent resolution such that the ratio of the number of pixels per geography distance covered is relatively the same in both images (e.g., 2 pixels per mile).

FIG. 6 illustrates the tiling of a base asset 610 and new asset 620.

Figure 7:
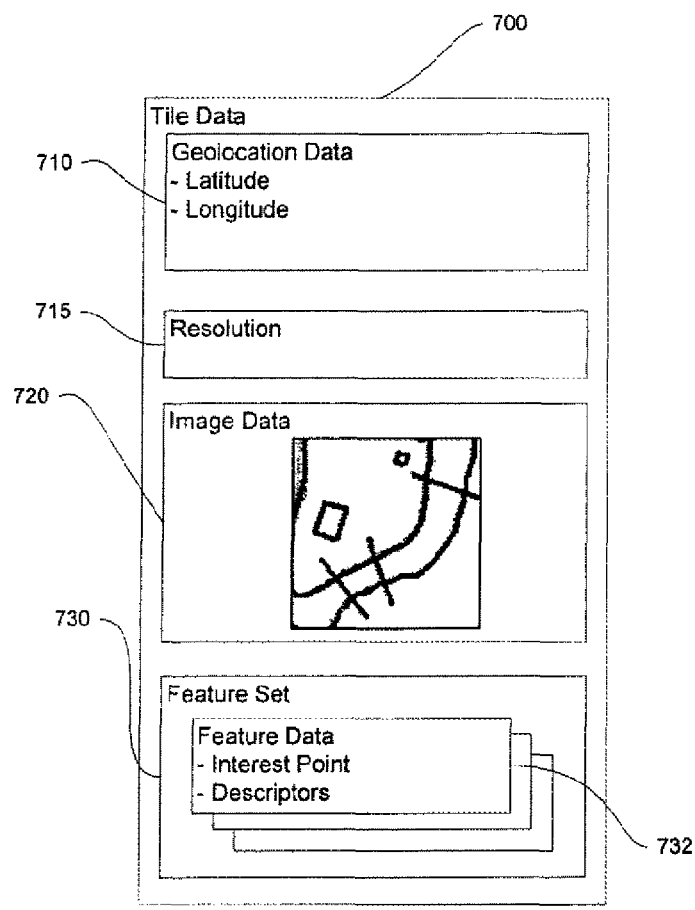
FIG. 7 is a functional diagram of a tile data structure in accordance with an aspect of the invention.

As shown in FIG. 7, a tile may be represented by a data structure 700. The data structure includes a digitized image 720 that represents the tile's portion of the image asset. The data structure 700 also includes geo-location data 710 and feature set 730, and may include data 715 identifying the resolution of the tile data.

In addition to the operations illustrated in the figures, an operation in accordance with a variety of aspects of the method will now be described. It should be understood that the following operations do not have to be performed in the precise order described below. Rather, various steps can be handled in reverse order or simultaneously.

As shown in FIG. 6, a tile 615 associated with the base asset is selected. For the purposes of illustration, it will be assumed that tile 615 is one of a plurality of tiles 610 that collectively represent a city. After the base asset tile is selected, the method seeks to determine whether the base asset tile and another tile associated with the new asset have overlapping features. Candidate new tile 625 may be selected in any number of ways, such by selecting a new tile whose geo-location data is the closet to the geo-location data of the selected base tile. As discussed more below, if the discrepancy of the geo-location data of the assets has been previously determined, that discrepancy may be used to help determine the best candidate tile associated with the new asset.

Features, such as interest points, are extracted from the selected tiles' image data. Interest points may correspond to geographic features that have relatively distinct characteristics compared to the remainder of the image. Interest points may include road intersections, lakes, mountains, cities and large buildings, or, more generally, areas where there are high and low-frequencies variations, such as image locations about which a distinctive variation of intensity or color is detected. As shown in the tile data structure 700 of FIG. 7, the feature may be represented by feature data 732. Feature data 732 identifies an image location and a descriptor, where the location is the coordinate position within the image of the interest point and the descriptor is a list of numbers that describe the image area surrounding the coordinate location. Scale Invariant Feature Transforms (SIFT), Speeded Up Robust Features (SURF) and other methods may be used to compile a feature set 730 of feature data 732. The features may be extracted before or after the tiles are selected.

Figure 8:
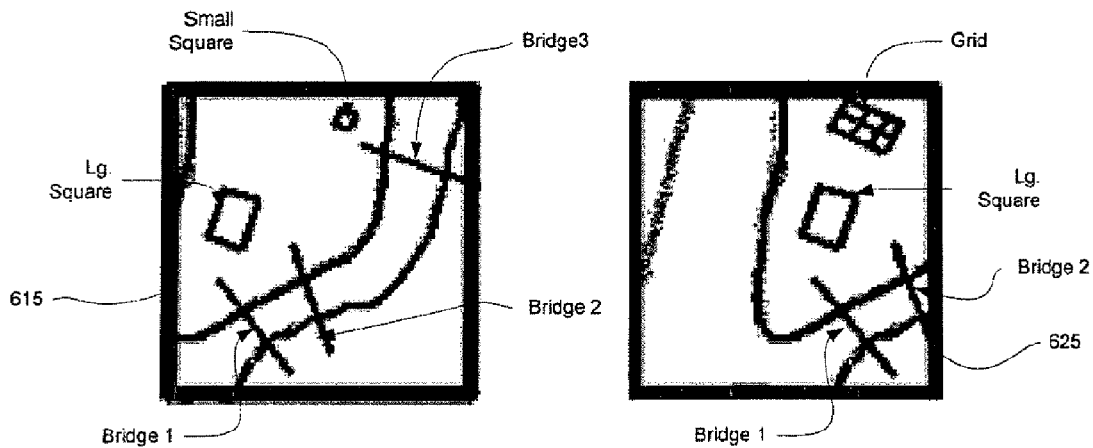
FIG. 8 is a functional diagram of feature sets in accordance with an aspect of the invention.
Figure 9A:
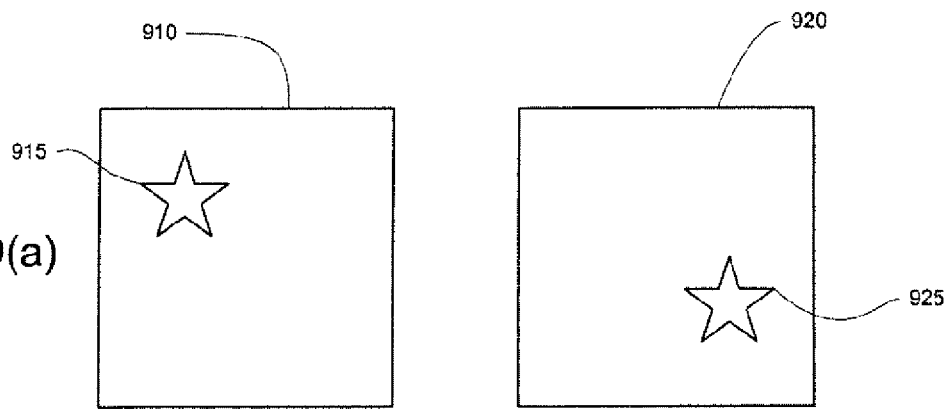
FIGS. 9(a)-(d) are functional diagrams of a feature being aligned in accordance with an aspect of the invention.
Figure 9B:
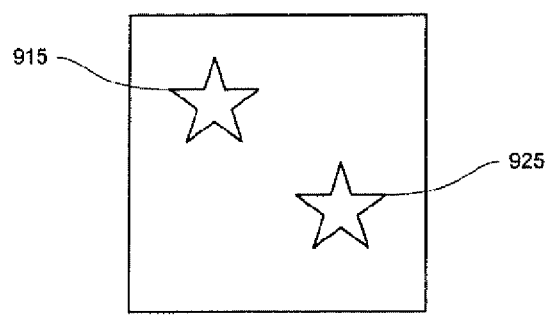
Figure 9C:
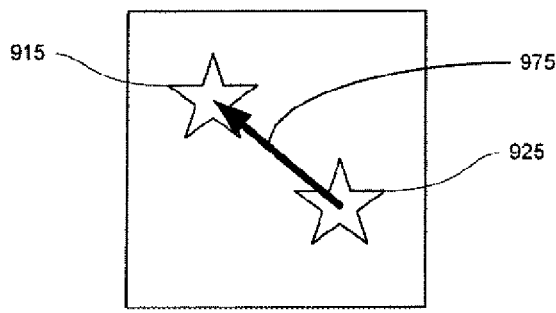
Figure 9D:
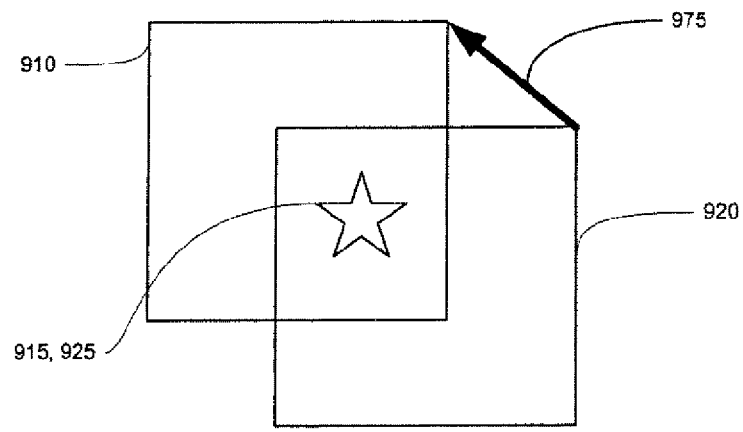

FIG. 8 shows potential values for the feature sets of base tile 615 and new tile 625. Provided that the image values about the three bridges, large square area and small square area shown in the base tile 615 are sufficiently distinct from their surrounding area, each will yield one or more numerical values meriting consideration as a feature. Sample data for feature set 855 of the base tile 615 and feature set 865 of the new tile 625 are shown in FIG. 8 (it being understood that the curly brackets represent numerical values).

After base tile 615 and candidate new tile 625 are selected, the features of the two tiles are compared. For example, the method may determine whether any of the features in feature set 855 of base tile 615 match any of the features in feature set 865 of new tile 625.

In one aspect of the invention, the matching of the features is based on two criteria, which are applied in succession: similarity of descriptors and consistency with a geometrical model or transformation that expresses a map from one tile to the other. Various methods may be used to efficiently compute matches based on similarity of descriptors, such as calculating a value based on the mathematical operation of dot product between descriptor vectors, whereby a high value of the product would be indicative of high similarity and a match. Thus, a threshold value may be set such that when a function processes the descriptor values of the two features, a match is considered to exist when the result from the function exceeds the threshold. For example, while only a portion of "Bridge 2" appears in new tile 625 shown in FIG. 8, it may still be considered a match to "Bridge 2" in tile 615 as long as the matching algorithm indicates that the match is close enough.

Further, search-accelerating algorithms and data structures may also be used to classify the descriptors of the features of one image prior to matching by similarity. For example, the feature descriptors of one image may be arranged in a space partitioning tree data structure according to the distribution in N-dimensional space of the descriptors. The tree is then used to accelerate the search of potential similarity matches for each feature from the other image.

In various circumstances, the matching by descriptor similarity will yield many false matches such that the features have similar descriptor values but their locations are nevertheless inconsistent from a geometrical point of view. An example of such inconsistent matches may be a situation in which the majority of features matched in the base image have locations to the left of their mates in the new image, but a few have matches sharply to the right. Accordingly, in one aspect, a geometrical model of the alignment transformation that is assumed to align one tile onto the other is applied to the candidate matches using robust statistic and data analysis methods. The results are then used to remove invalid and outlier matches from the candidates. Random Sample Consensus (RANSAC) is just one algorithm that may be used to determine whether individual features match one another. In one aspect, the parameters of the RANSAC analysis, or other methodology, are set so as to limit the number of matches that are searched for.

Using the example of FIG. 8, the two bridges, large square and grid shown in the image of base tile 615 are stored as values (which may comprise a collection of numbers such as vectors) in feature set 855. These numerical values can be compared with the values stored in feature set 865 of new tile 625. If the features' values are sufficiently similar, the features will be considered to match as indicated by arrows 850. Using the sample images shown in FIG. 8, the two bridges and large square appear in both tiles and, accordingly, would be considered matching. In an alternative aspect, two features are determined to be matching if their descriptors indicate that they look more similar to one another than to any other features in the tile.

Features may also be weighted, for example, by a value calculated to measure their relative utility to the process and their need to be aligned (e.g., even a slightly misaligned road can be very distracting, but a misaligned large forest of trees less so). Features which fall below a particular weight threshold would not be used for the purpose of identifying matching features.

Some features may appear in the image of one tile but not in the other. This can occur even if the feature is actually present in the geographical area. For example, the grid appearing in the image of new tile 625 in FIG. 8 does not appear in the image of base tile 615, even though its presence would be expected given its position with respect to the two bridges. In one aspect, missing features are simply ignored. In another aspect, the number or quality of missing feature matches may be used to determine whether the tiles overlap.

After matching features are identified, alignment data is determined that corresponds with the relative difference in positions of the features between the base and new asset. For example, after inlier matching features are identified based on the RANSAC analysis, alignment data is calculated based on the geometrical model of the transformation that is intended to map one tile onto the other. In one aspect in which the model is a simple translation from one tile onto the other, the average difference of the positions of the matching features will yield the alignment data.

For convenience of processing, the alignment data may also be represented as pairs of tie points. In this representation, one point (such as the center of the tile) is arbitrarily selected on a tile of the base image for which an alignment vector has been computed. The vector itself is represented by stating that this arbitrary point is "tied" to a point in the corresponding tile of the new image that is displaced from the center of the new image's tile by the alignment vector itself. Iterating this generation of tied points over the set of computed vectors results in a grid of correspondences.

For ease of illustration, the alignment data shall be assumed to be in the form of a vector, which is determined by subtracting the horizontal/vertical position of the tie point in the base tile from the horizontal/vertical position of the matching tie point in the new tile, or vice versa.

FIG. 9 illustrates one possible way of determining the feature alignment data. FIG. 9(a) shows a base tile 910 and a new tile 920, each with a matching feature 915 and 925, respectively, and identical geo-location data. While the geo-location data may be equivalent, the geo-location data of one of the tiles may be somewhat inaccurate. Accordingly, when the tiles of the two assets are processed together, such as combining their image data, the feature will be misaligned as shown in FIG. 9(b). As shown in FIG. 9(c) and discussed above, a vector 975 may be computed that represents the difference between the position of the feature in the base tile and the position of the feature in the new tile. When base tile 910 and new tile 920 are processed together, the alignment vector 975 may be applied to geo-location data of the new tile in advance, effectively translating the new tile to cause the features 915, 925 to be properly aligned as shown in FIG. 9(d). The alignment vectors may be stored as latitude and longitude (e.g., +5° latitude, −2° longitude), pixels (e.g., +5 pixels horizontal, −2 pixels vertical) or other units of measurement.

Figure 10A:
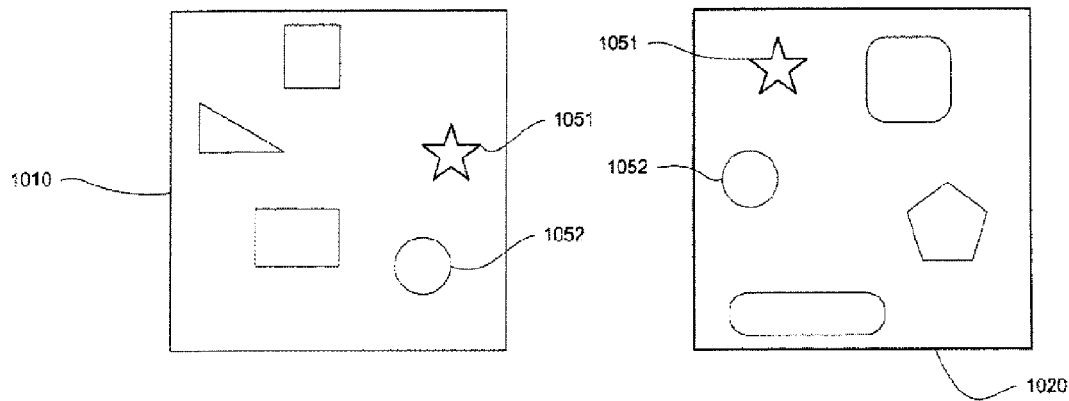
FIGS. 10(a)-(c) are functional diagrams of features being aligned in accordance with an aspect of the invention.
Figure 10B:
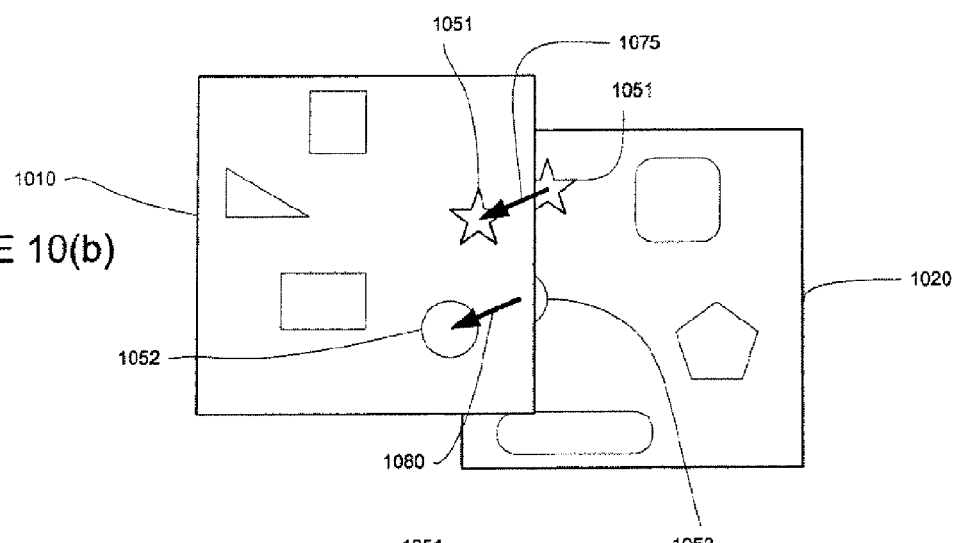

FIG. 10 illustrates the calculation of a single tile alignment vector from multiple features. Matching features 1051 and 1052 appear in the bottom-right corner of base tile 1010 and along the top-left corner of new tile 1020 as shown in FIG. 10(a). The remaining features (illustrated as shapes within the tiles) are considered not to match. In the example of FIG. 10, the tiles are not intended to align perfectly but, rather somewhat overlap one another. FIG. 10(b) illustrates how the tiles would be aligned based solely on their geo-location data. FIG. 10(b) also illustrates the alignment vectors 1075 and 1080 computed from the positions of the matching features. From these vectors, a single tile alignment vector 1090 may be determined, such as by averaging the feature alignment vectors (due to photogrammetric distortions, the alignment vector may not be the same for all of the features in the new tile). When tile alignment vector 1090 is applied to new tile 1020, as shown in FIG. 10(d), the features will be sufficiently aligned. In accordance with another aspect, the data used to align the tiles is not stored as a single value but, rather, a collection of values (such as all of the feature alignment vectors).

Figure 10C:
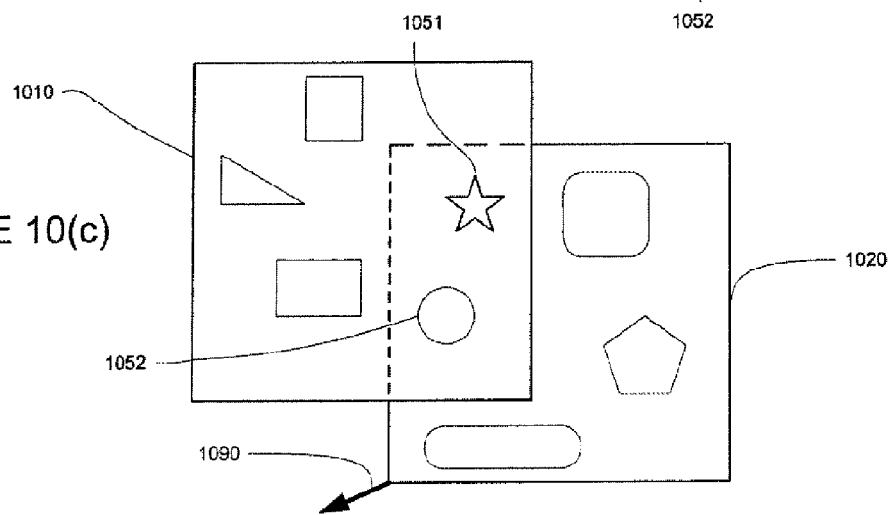

As also shown in FIG. 10, the system and method can be used to align two tiles that overlap for less than a majority of their geographic area. This is particularly advantageous when two tiles slightly overlap and need to be rendered contiguously. For example, a tile from the base asset may correspond with one state and a tile from the new asset corresponds with another, bordering state. If the original geo-location data of the two tiles are used when a user is viewing the border between the states on a display 160 (FIG. 1), and the geo-location data of the new tile is incorrect relative to the base, the individual tiles will not align correctly as shown in FIG. 10(b). This can make roads look like they are split in half or result in similarly distracting artifacts. However, if the alignment vector 1090 for the tiles is used, then the borders can be rendered more seamlessly as shown in FIG. 10(c).

Figure 11:
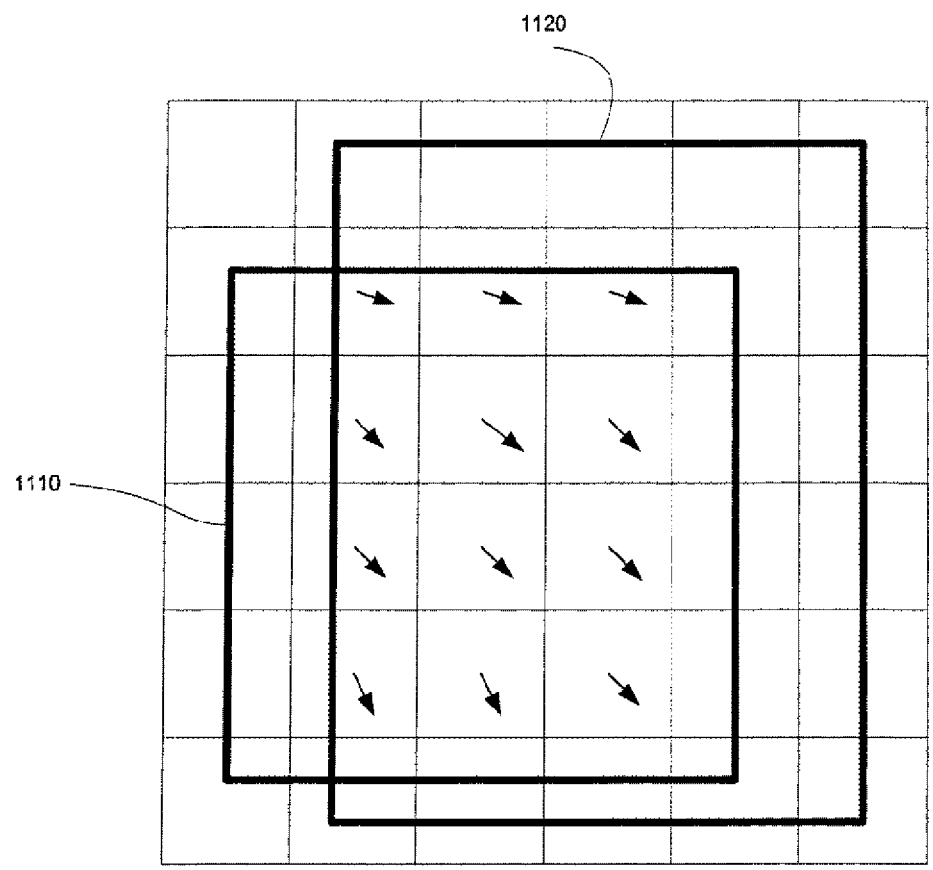
FIG. 11 is a functional diagram of tile alignment vectors in accordance with an aspect of the invention.

Alignment data may be calculated for each tile associated with the assets or a subset thereof, such as for every grid cell (correlating with a tile) whose center is contained by both the base and new tile. In that regard, and as shown in FIG. 11, a collection of alignment vectors (indicated by the arrows) may be used whenever it is desired to process the tiles of a new asset 1120 with respect to a base asset 1110. As reflected in FIG. 11, it will be noted that different tiles may have different alignment vectors (such as some pointing towards one compass direction more than the others), which may result from any number of factors including the position of the camera when the base image was captured versus when the new image was captured. Moreover, because the base asset's geo-location information is considered accurate enough to be used as a reference, the alignment vectors can be used to calculate a longitude and latitude value for the center of the tiles in the new asset. In one aspect, the alignment data obtained in connection with one resolution is used to help calculate the alignment data of other resolutions.

Figure 12:
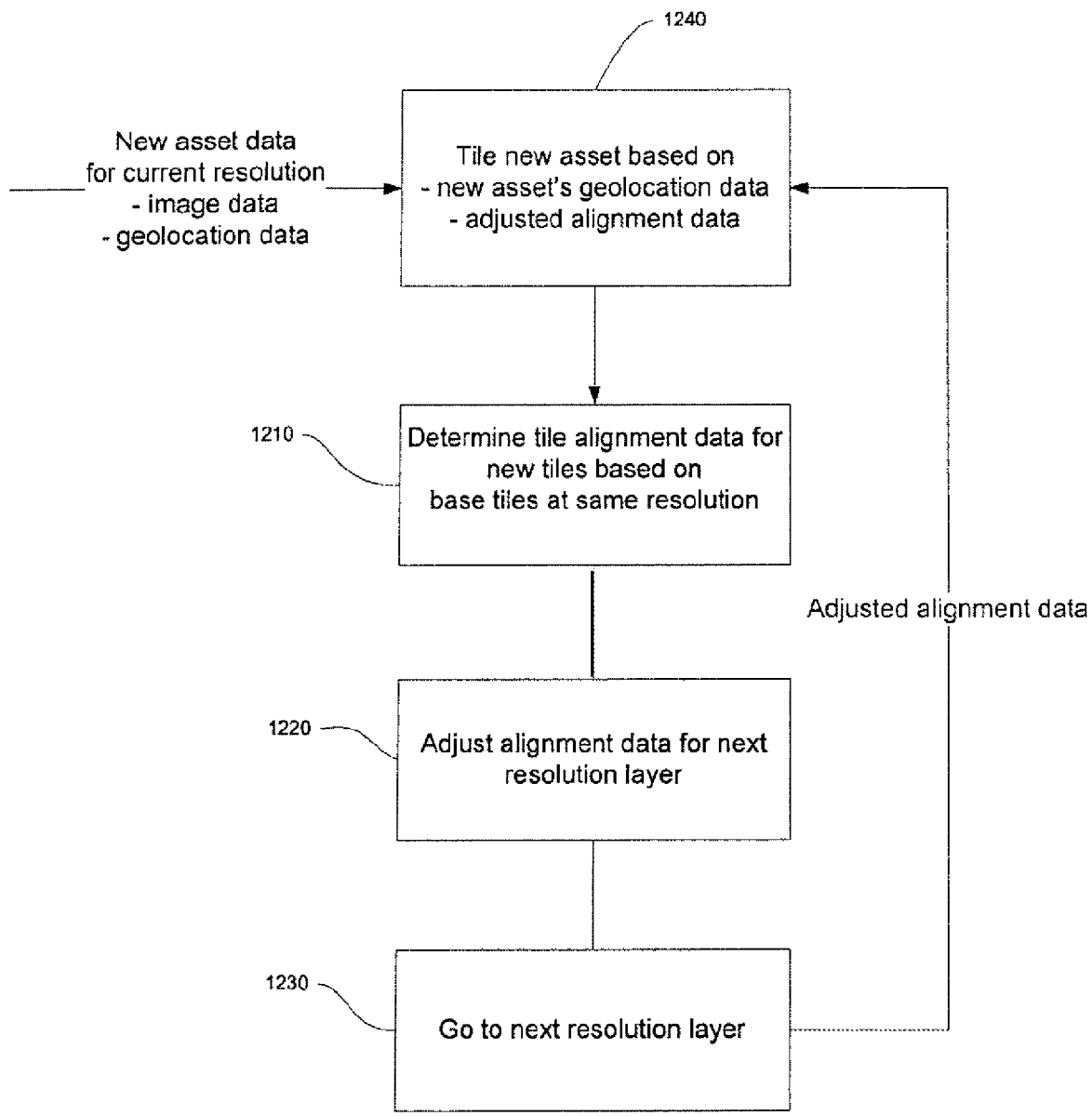
FIG. 12 is a flow diagram in accordance with an aspect of the invention.

As shown in block 1210 of FIG. 12, the alignment data is calculated for the current resolution layer of the base and new asset in a manner such as that set forth above. For example, the method may start with the lowest resolution layer as set forth above.

As noted above, the base and new asset may disagree with respect to where a particular point, expressed in latitude and longitude, appears in their lowest-resolution image data. A similar discrepancy may be propagated throughout all resolution layers.

In one aspect of the invention, the alignment data of the prior layer may be used when determining the alignment data for the next resolution layer. For example, as shown at block 1220, the alignment data obtained from the current resolution layer (which, at first, may be the lowest resolution) is adjusted to correspond with the next highest resolution layer. For example, if the medium resolution is twice as high as the low resolution (in terms of pixel height and width), and the alignment data were stored as a set of tile-by-tile alignment vectors, then the horizontal and vertical components of the low-resolution alignment vectors can be doubled. As indicated in block 1230, the method then proceeds to process the next resolution layer, such as the medium resolution layer.

As indicated in block 1240, the adjusted alignment data from the prior layer is then used as a parameter when determining the alignment data for the next layer. For example, rather than comparing medium-resolution tiles based solely on the medium-resolution tiles' geo-location data, the adjusted alignment data from the associated low-resolution tiles may be applied to the new tiles first. In many circumstances, this will lead to a greater number of positive matches among features.

Figure 13:
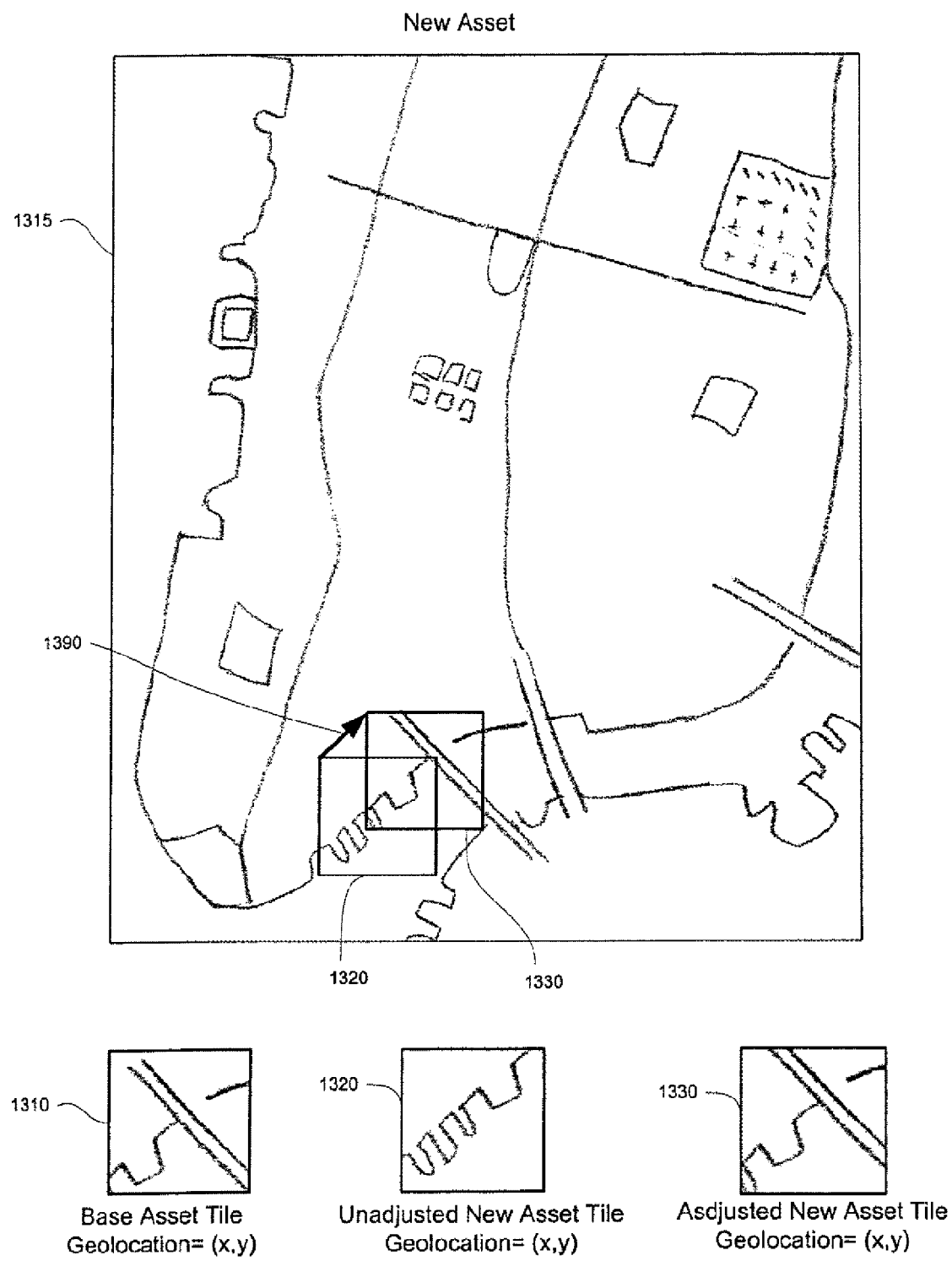
FIG. 13 is a functional diagram of relocating tiles in accordance with an aspect of the invention.

FIG. 13 provides an example of how the adjusted alignment data may be used in connection with the medium resolution layer. Tile 1310 represents a tile from the base asset, and shall be assumed to have a geo-location position of (40°42'32.15", 74°00'07.00"). Tile 1320 represents a medium-resolution tile from the new asset 1315 if the new asset were tiled without the benefit of the adjusted alignment data. If the geo-location data of the base asset and new asset are misaligned, the image data of the new tile 1320 at (40°42'32.15", 74°00'07.00") would not align with the image data of the base tile at (40°42'32.15", 74°00'07.00"). As shown in FIG. 13, the two tiles 1310 and 1320 have few features in common.

However, if the alignment data from the low-resolution new tile is applied to the new medium-resolution tile, the tiles may be much more closely aligned. Thus, by applying, for example, an adjusted alignment vector 1390 to the new tile 1320, the position of the new tile will change (reference number 1330) and the portion of the new asset that corresponds with new tile 1330 at (40°42'32.15", 74°00'07.00") will be much closer to the portion of the base asset that corresponds with base tile 1310 at (40°42'32.15", 74°00'07.00"). Although the position of the adjusted new tile 1330 may still be misaligned with respect to base tile 1310, the discrepancy is less than if the alignment data from the prior layer was never applied.

After the alignment data is applied from another resolution layer, the features of the new tiles may be compared with the features of the base tiles in the same manner as described above (FIG. 12, block 1210). In other words, the medium resolution tiles are aligned based not only on the alignment data from the lower resolution images, but also based on the features in the medium resolution tiles.

The process may be repeated for each of the resolution layers associated with the base and new assets, such that the alignment data from the prior resolution layer is used to help determine the alignment data for the next resolution layer. Although it is particularly advantageous to start with the lowest resolution and work towards the higher resolution layers one layer at a time, the method may also start anywhere in the layer pyramid and work up, down or both.

Although the assets could be retiled based on the alignment data, such retiling may be a computationally expensive operation involving updates to a database of tiles. Alternatively, in another aspect of the invention, the alignment data from a prior layer is used to predict, given a tile of the base image, the location of a tile in the new image where image matches are likely to be located.

The adjusted alignment data passed from one layer to the next is not limited to any particular data structure or method of calculation. For example, the alignment data may be based on an average of the alignment vectors for each of the individual tiles within a particular resolution layer, such that a single vector associated with the layer is passed and used to align the next resolution layer. Alternatively, all of the alignment vectors for the tiles may be passed, such that the new tile at the next higher-resolution uses an interpolation of those tile vectors that correspond most with its associated geographical area.

Figure 17:
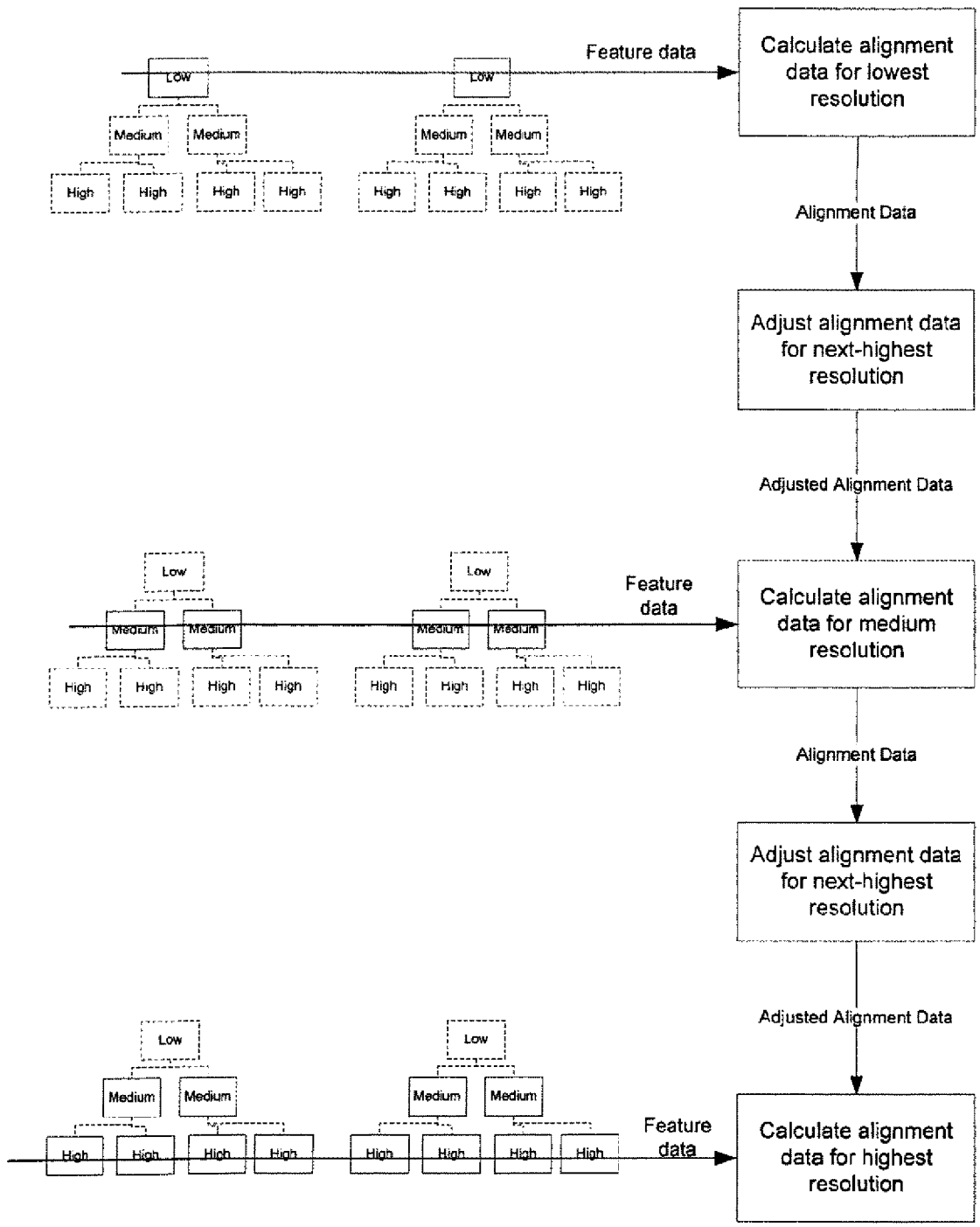
FIG. 17 is a flow diagram of processing multiple resolution layers in accordance with an aspect of the invention.

FIG. 17 provides another functional illustration of an aspect of the invention, whereby the current feature data and prior (and adjusted) alignment data are used for each subsequent layer.

The use of alignment data from one resolution to another is particularly helpful when there are gross misalignments at the higher resolution. For example, as shown in FIG. 13, the misalignment of the base tile 1310 and unadjusted new tile 1320 is roughly half the size of the tile. While a few features are present in both tiles, there are not many. If the misalignment was roughly the size of a tile, there would be fewer to no features in common, making alignment difficult if not impossible. However, by adjusting the new tile 1330 in advance, the tiles can be fine tuned with respect to their alignment.

In yet another aspect, tile features may be re-indexed.

Figure 14:
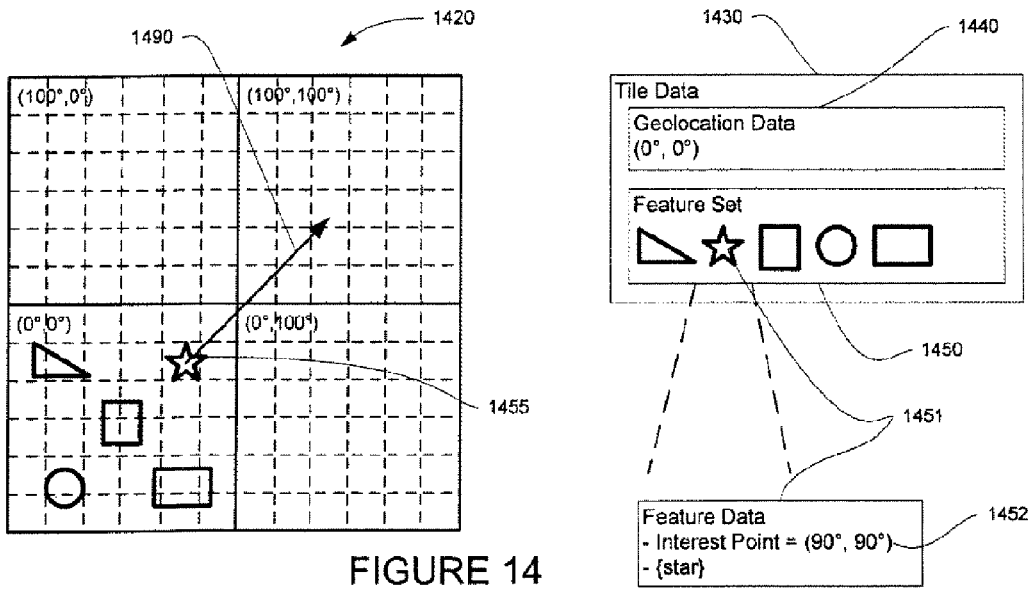
FIG. 14 is a functional diagram of features before being reindexed in accordance with an aspect of the invention.

FIG. 14 illustrates, by way of example, a new asset 1420 divided into four tiles. Image features appear in the tile with a geo-location of (0°, 0°). In that regard, the tile data 1430 for that tile includes geo-location data 1440 having a value of (0°, 0°) and a feature set 1450 containing the following shapes: triangle, star, square, circle and rectangle. As discussed above, the tiles may be aligned to the base tile (not shown) by translating them in accordance with alignment vector 1490. (It will be understood that the 0° and 100° values are for illustration purposes and not intended to convey an actual latitude/longitude position on the Earth.)

Figure 15:
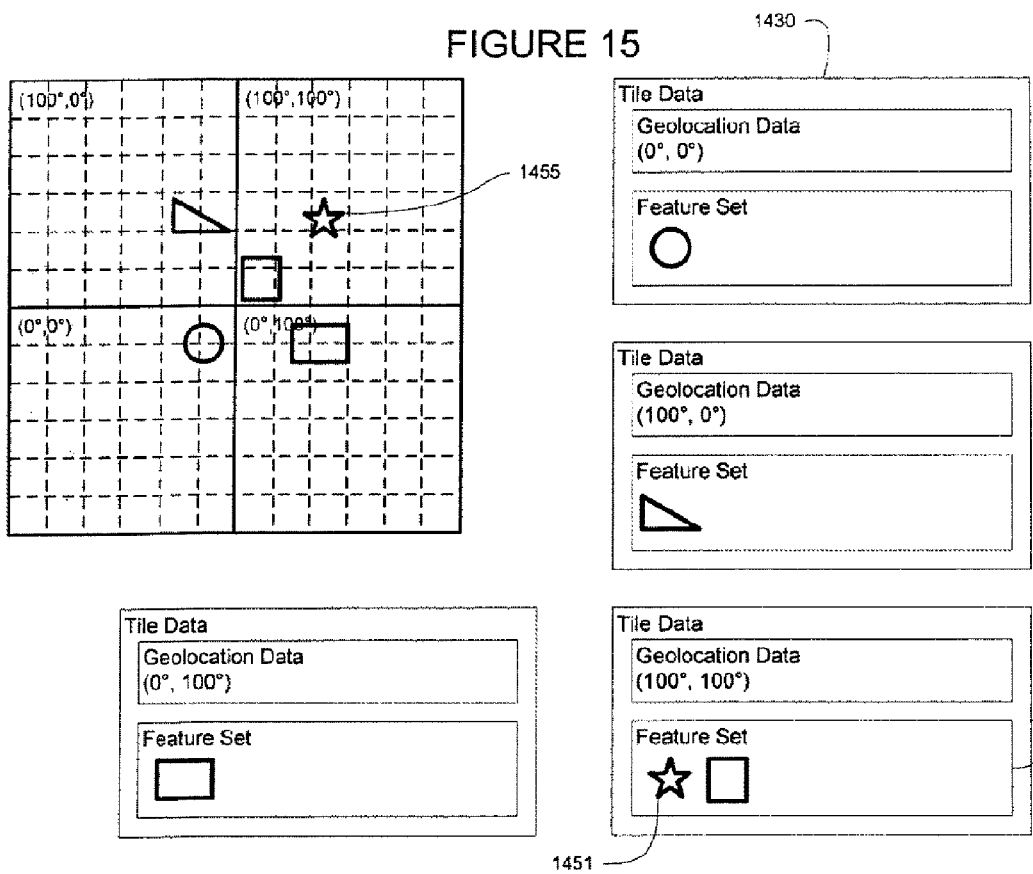
FIG. 15 is a functional diagram of features after being reindexed in accordance with an aspect of the invention.

As shown in FIG. 15, when the tiles of the new asset 1440 are translated to better align with the base tiles, the features that were associated with a tile at a particular geo-location may lose their association with the tile. For example, while the circle may remain in the tile at (0°, 0°), the other features may now appear in other tiles, such as the triangle in the tile at (100°, 0°), the square and star in the tile at (100°, 100°), and the rectangle in the tile at (0°, 100°).

In one aspect, the feature sets of the tiles will be discarded and their images reprocessed to again extract their features.

In another aspect, the feature data is used to reallocate the features to other tiles without reprocessing the image. For example, assume the geo-location of the tiles, the location of the feature, and the alignment vector are all stored in latitude and longitude. If so, then one manner in which the features can be reallocated to realigned tiles is to add the alignment vector 1490 to their locations. The sum is then compared with the geo-location data of the neighboring tiles. If the sum falls within the latitude/longitude range of a neighboring tile, then the feature data may be disassociated with its prior tile and associated with the other tile.

By way of example, if the location 1452 of the star feature 1455 was (90°, 90°) prior to retiling, applying the alignment vector 1490 having a value (+35°, +35°) to the old location yields a new location of (125°, 125°). This places the star in the range of the tile having a geo-location of (100°, 100°). Accordingly, the feature data 1451 is associated with feature set 1550 of the tile data 1540 at geo-location (100°, 100°) and dissociated with the feature set 1450 of tile data 1430 at geo-location (0°, 0°). Advantageously, other than changing the pointer or other identifier that associates feature data with a tile, and perhaps the location of the feature, no other information has to be changed. Optionally, and particularly if the relevant information is stored in different units (such as the alignment vector being stored in pixel units), some data may be converted from one unit to another; even so, it is expected that the processing time associated with converting among units and identifying the tile containing the aligned feature will typically be less than reprocessing the aligned tile to extract features from the image data.

In one aspect, subsequent to the tile-by-tile alignment processing, an asset-wide consistency step is applied to the result. In some cases, the tile-based alignment may yield erroneous alignment data—in spite of the fact that alignment data computation is based on what, locally on individual tiles, appears to be very similar and geometrically consistent feature matches. Such vectors may be detected by imposing, globally on the base and new assets and assets a whole, a second geometrical model of transformation. For example, if all of the alignment data for one tile is a "left and up" translation and the alignment data for all of its neighbor tiles is the same "right and down" translation, the aberrational tile may have its alignment data adjusted to be the same as it neighbors. The aberrational tile alignment data may be changed based on applying robust statistics to the tile alignment data (such as vectors or tie-points), and identifying and rejecting the outlier vectors.

Particular advantages arise when the foregoing systems and methods are used in connection with parallel processing.

Figure 16:
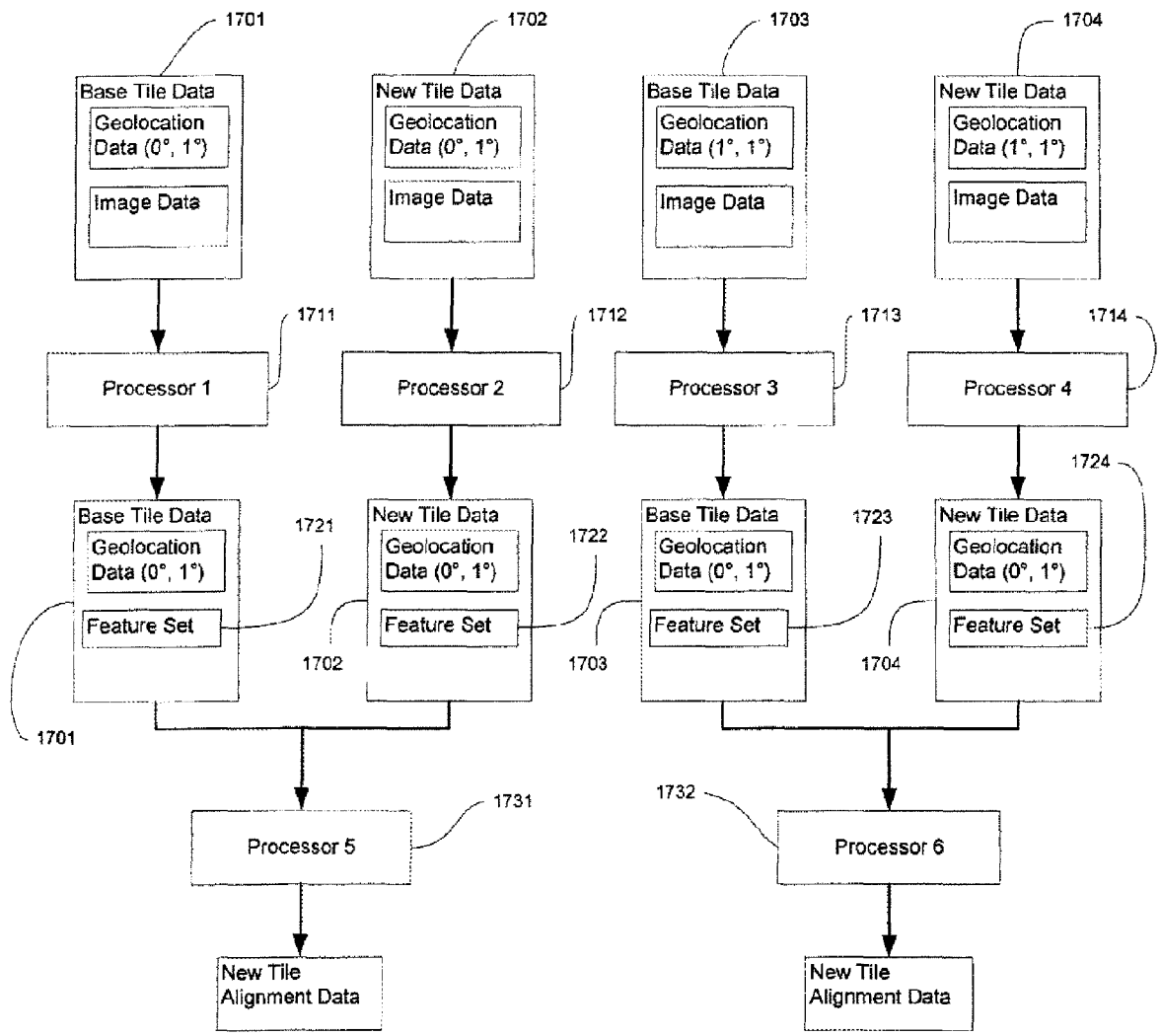
FIG. 16 is a flow diagram of parallel processing of tile data in accordance with an aspect of the invention.

All of the tiles can be processed in parallel to extract their feature sets. By way of example and as shown in FIG. 16, four tiles (base tiles 1701 and 1703 and new tiles 1702 and 1704) are individually processed in parallel with four different processors 1711-1714 so as to extract their feature sets 1721-1724.

In turn, pairs of sets of base and new features, each set extracted on a tile, can be processed in parallel to obtain their alignment data. For example, feature sets 1721 and 1722 of base tile 1701 and new tile 1702 can be processed by processor 1731 at the same time feature sets 1723 and 1724 of base tile 1703 and new tile 1704 are processed by processor 1732.

Accordingly, in one aspect, the method and system are massively parallel, with feature extraction, matching and realignment occurring independently and in parallel across as many processors as are available.

Given that a typical pyramid of tiles for a single given area may include over a thousand tiles, each having tens of thousands of pixels, the method and system's ability to add parallel processing provides exceptional advantages over other systems.

In one aspect, the parallel processing is implemented using the "MapReduce" or similar framework. (See Jeffrey Dean & Sanjay Ghemawat, "MapReduce: Simplified Data Processing on Large Clusters", Proc. $6^{th}$ Conf. on Operating Systems Design & Implementation (OSDI), December 2004 [available at http://209.85.163.132/papers/mapreduce-osdiO4.pdf], the disclosure of which is hereby incorporated by reference.) In this framework (which is not limited to the MapReduce framework), it is assumed that the input and output data associated with a parallel computation are organized in sequences of independent records, each associated to a well-known quantity, such as a database key. The keys are such that they can be ordered, such as integer numbers. Also, it is not required that the input keys be unique, that is, each key need not be associated one-to-one with a particular input record. The input and output records need not be of similar type, in fact they may represent conceptually very different things, e.g., the input may be a list of addresses in a phone book and the output a table of frequency of digits in phone numbers.

The parallel computation of the framework may be separated into two phases. First a "map" function is applied in parallel, independently and concurrently, to each set of input records having the same input key, producing a sequence of intermediate data, each uniquely identified by a key. It is not necessary that the key of the intermediate data be the same as the input key, but it is advantageous for the intermediate keys to be amenable to ordering. Second, a parallel sorting procedure is applied to the output of the parallel map operation, such that intermediate records with consecutive keys are logically placed consecutively in the sequence of intermediate data. Third, a "reduction" function is applied in parallel, independently and concurrently, to each set of intermediate data having the same intermediate key. Each application of the reduction function normally produces one output record.

The framework is well suited to so-called "embarassingly-parallel" algorithms, and all its underlying parallelization systems and methods (such as the distribution of computing tasks and data to individual processors, the recovery from accidental failures of individual processors, and so forth) can be automated in a set of prebuilt computer programs. In one aspect, the programmer need only provide the computer code describing the format of the input, intermediate and output data, and the operations performed in the "map" and "reduce" functions.

The alignment algorithm described may be applied to such a framework. The "map" operation may be applied to feature extraction, where the input is a sequence of tiles from the base and other assets. Each map operation takes, as input, the base and other assets' imagery tiles associated to a particular tile geo-location, with the geo-location itself serving as the input key. The operation produces sets of extracted features as the intermediate data. In the case in which no feature re-indexing is applied, the intermediate data may be keyed on the same geo-location as the input.

However, when estimated initial alignment data is available from the result of aligning a previous pyramid level, it may be given as an additional input to each map operation and used for the tile-reindexing computation described above. In this case, on each tile, one set of features (such as those extracted from a base asset tile asset), is re-keyed in the output of the map operation according to the geo-location of the tile whereupon they are predicted to find good candidate matches on the other asset, whereas the features extracted from the tile belonging to the other asset are output with an unchanged key to the intermediate set of data.

The framework is then used to sort the stream of intermediate data produced in parallel by the mappers. The input to each "reduce" computation includes the sets of features labeled with the same geo-location. In this case such features are the sets of base-asset features and new-asset features belonging to geo-locations that are expected to match. Hence, alternative to that described above, the matching and alignment computation are both performed in the "reduce" function, instead of using the mappers to match features, thus producing the output set of alignment vectors, each associated to its proper geo-location. The output data is consequently keyed on the same key as the intermediate ones.

Another advantage relates to the ability to contemplate a variety of alternatives. For example, the alignment data may be calculated not only with respect to translocation, but also rotation (in the event the image maps are not aligned in the same compass direction), warping (such as may occur if the two assets were captured from different camera angles) and relative size (such as may occur if the assets were captured at different heights). In that regard, when computing a composite rotation/translation, the translation and angle of rotation associated with the alignment data may be computed from the matched features in accordance with various methods, and the alignment data expressed as a vector and rotation angle, affine mapping, or other values.

As expressed above, the alignment data need not be a vector. For example, the alignment data may comprise matching features functioning as tie-points, with the software (such as ERDAS) rendering the image using the tie-points to smoothly warp the image so as to line up the features.

Moreover, the method may be used in connection with more than one new and/or base asset. In one aspect, specifically, one or more assets that are known to be well-aligned with each other can be used as one single larger "super" base asset, against which the new assets can be aligned. In another aspect, multiple new assets can be given as input to the computation, each aligned to the base asset or "super" base asset independently of each other.

In yet another aspect, for the case in which no single asset can be trusted to be exactly geo-located, all of the assets may be aligned (rather than aligning all of the asset to a single base asset). In such a case, all asset tiles may be allowed to move with respect to each other, as predicted by the robust matching of features extracted on them, and the solution produced by the above algorithm is the one that minimizes the weighted sum of the movement of the tiles of all assets. For example, denote with X the geo-location of a certain physical point-like characteristic of the terrain (e.g., a mountain top, a road intersection) which is observed in a number N of assets $A\_1, A\_2, \ldots, A\_N$. Denote with $(x\_1, x\_2, \ldots, x\_N)$ the presumed, erroneous, geo-locations of the images of X as predicted by the assets thereof, such that the errors in geo-location be denoted as $t\_1 = X - x\_1, t\_2 = X - x\_2, \ldots, t\_N = X - x\_N$. Note that X, as well as the $x\_i$ and $t\_i$, for $i=1, 2, \ldots, N$, are vectors, e.g. represented as pairs of latitude/longitude coordinates. Each vector $t\_i$ can be regarded as the correction to be applied to the corresponding $x\_i$ so that its error is zeroed. This is because, from the previous formulae, it follows that $X = x\_i + t\_i$, for all $i=1, 2, \ldots, N$. A set of equations like these can be written for each of many point-like terrain features $X\_a$, $X\_b$, etc. If the true locations of such terrain features were known, and their number was at least N, a linear system of equations could be written and solved for the unknown $t\_i$'s. The solution would therefore directly produce a set of tie points to align the assets. However, the more common case, and the one addressed by this aspect, is the one in which none, or just much fewer than N, of the true location of the terrain features $X\_a$, $X\_b$, etc., are known. Rather, only several tuples of matches $(x\_1, x\_2, \ldots, x\_M)$, with M less than or equal to N, are given (e.g., after having been computed as described in the preceding aspects). Such a "relative alignment" problem allows the equations to be written like the foregoing (e.g., $X\_a = x\_1 + t\_1$, $X\_a = x\_2 + t\_2$, etc.) but the $X\_a$ is here just as unknown as the vectors $t\_1$, $t\_2, \ldots, t\_N$. Similar equations can be written for every matched tuple of image features. Given enough of these equations, the linear system can be solved using a "least squares sense" analysis where the "least squares" solution is the set of vector $t\_i$'s that minimizes the sum of the motions of all the tiles, without being all zeroes.

In yet another aspect, the above solution for the case in which no trusted assets are given can be computed after assigning to each asset a "confidence weight". For example, a high value of the confidence weight would be indicative of higher trust in the accuracy of the geo-location of an asset than a lower value. Using the methods of linear least squares analysis, these weights can be applied to the equations described in the previous aspect, allow one to compute a "weighted least squares" solution for the unknown $t\_i$'s, with the desirable property that the tiles of assets affected by higher confidence will be applied a smaller correction than that applied to tiles of assets of lower confidence. In other words, more trusted assets will be aligned less than less trusted assets.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A computer-implemented method of processing geographic images having features comprising:
   associating, with one or more processors, a first data structure stored in a non-transitory computer-readable medium with first geo-location data and a first set of features from a geographic image, the first set of features being associated with a geographic location;
   associating, with the one or more processors, a second data structure stored in the non-transitory computer-readable medium with second geo-location data and a second set of the features, the second set of features being associated with the geographic location;
   matching, with the one or more processors, a feature from the first set of features with a feature from the second set of features based on descriptor values assigned to each of the features;
   determining, with the one or more processors, an alignment vector to be applied to the second geo-location data to align the matched features; and
   associating, with the one or more processors, the feature in the first set of features with the second data structure dependent on the alignment vector and the geographic location of the feature.

2. The method of claim 1 wherein the data structures are associated with portions of the same geographic image.

3. The method of claim 2 wherein the geographic image is divided into tiles and the data structures correspond with the tiles.

4. The method of claim 1 further comprising a base image, wherein the alignment vector brings the first and second geo-location data into alignment with the base image.

5. The method of claim 4 wherein the alignment vector is determined based on the features and information extracted from a geographic image having a resolution different than the base image.

6. The method of claim 1 wherein a different alignment vector is applied to the first geo-location data.

7. The method of claim 6 wherein the alignment vector and different alignment vector are dependent upon weights associated with the images.

\* \* \* \* \*